United States Patent
Chang et al.

(10) Patent No.: US 11,850,673 B2
(45) Date of Patent: Dec. 26, 2023

(54) BUTTON CELL AND METHOD FOR WELDING ELECTRODE TABS TO A POLE SHELL OF THE BUTTON CELL

(71) Applicant: FUJIAN NANPING YANPING DISTRICT NANFU NEW ENERGY TECHNOLOGY CO., LTD., Nanping (CN)

(72) Inventors: Haitao Chang, Nanping (CN); Yongfeng Ye, Nanping (CN); Zhiming Zhang, Nanping (CN); Huazao Xu, Nanping (FJ)

(73) Assignee: FUJIAN NANPING YANPING DISTRICT NANFU NEW ENERGY TECHNOLOGY CO., LTD., Nanping (CN)

( * ) Notice: Subject to any disclaimer, the term of this patent is extended or adjusted under 35 U.S.C. 154(b) by 723 days.

(21) Appl. No.: 16/914,923

(22) Filed: Jun. 29, 2020

(65) Prior Publication Data

US 2021/0331268 A1 Oct. 28, 2021

(30) Foreign Application Priority Data

Apr. 24, 2020 (CN) .......................... 202010335164.5
Apr. 24, 2020 (CN) .......................... 202010335170.0

(51) Int. Cl.
*B23K 11/11* (2006.01)
*B23K 31/00* (2006.01)
(Continued)

(52) U.S. Cl.
CPC ........... *B23K 11/11* (2013.01); *B23K 11/0026* (2013.01); *B23K 31/003* (2013.01); *H01M 50/109* (2021.01); *H01M 50/538* (2021.01); *B23K 2101/36* (2018.08); *H01M 10/0427* (2013.01); *H01M 10/0431* (2013.01); *H01M 10/0587* (2013.01); *H01M 10/285* (2013.01); *H01M 10/286* (2013.01); *H01M 50/153* (2021.01); *H01M 50/536* (2021.01)

(58) Field of Classification Search
CPC .... H01M 4/02; H01M 50/109; H01M 50/538; H01M 50/536; H01M 50/153; H01M 10/0427; H01M 10/0431; H01M 10/0587; H01M 10/285; H01M 10/286; H01M 6/103; B23K 11/11; B23K 11/0026; B23K 11/002; B23K 11/16; B23K 31/003; B23K 2101/36
See application file for complete search history.

(56) References Cited

FOREIGN PATENT DOCUMENTS

CN 110048137 * 7/2019

* cited by examiner

*Primary Examiner* — Matthew W Van Oudenaren
(74) *Attorney, Agent, or Firm* — Dragon Sun Law Firm, PC; Nathaniel Perkins

(57) ABSTRACT

The present disclosure discloses a button cell, and a method for welding electrode tabs to a pole shell of the button cell. The button cell includes the pole shell and an electric core. The pole shell consists of an anode shell and a cathode shell. The button cell further comprises at least one metal sheet. A cathode tab and/or an anode tab of the electric core is/are welded to the metal sheet, and the metal sheet is then welded to the cathode shell and/or the anode shell. The button cell manufactured by the invention has a complete surface, and can avoid phenomena such as electrolyte leakage and surface bulging caused by the rupture of the polar shell.

16 Claims, 7 Drawing Sheets

(51) Int. Cl.
    *B23K 11/00*            (2006.01)
    *H01M 50/109*       (2021.01)
    *H01M 50/538*       (2021.01)
    *B23K 101/36*        (2006.01)
    *H01M 10/0587*     (2010.01)
    *H01M 50/153*       (2021.01)
    *H01M 10/04*         (2006.01)
    *H01M 10/28*         (2006.01)
    *H01M 50/536*       (2021.01)

BUTTON CELL AND METHOD FOR WELDING ELECTRODE TABS TO A POLE SHELL OF THE BUTTON CELL

CROSS-REFERENCE TO RELATED PATENT APPLICATION

This application claims priority to and the benefit of CN 202010335164.5, filed Apr. 24, 2020, and CN 202010335170.0, filed Apr. 24, 2020. The entire disclosures of the above-identified applications are incorporated herein by reference.

TECHNICAL FIELD

The present disclosure discloses a button cell, and a method for welding electrode tabs to a pole shell of the button cell.

BACKGROUND

A coiled button cell comprises an anode shell, a cathode shell, an insulating seal ring and an electric core. The anode shell and the cathode shell are buckled with their upper opening and lower opening keeping face to face to form a cylindrical button cell shell. A gap is reserved between the anode shell and the cathode shell, and filled with the insulating seal ring to electrically isolate the anode shell from the cathode shell. An accommodating cavity is formed among the anode shell, the cathode shell and the insulating seal ring, and the electric core is provided in the accommodating cavity. The electric core comprises an anode piece and a cathode piece which are separated by a diaphragm. The anode piece, the cathode piece and the diaphragm are coiled to form the electric core. An axial cavity is formed in the center of the electric core. The anode piece is provided with an anode tab which extends out of the electric core and is welded to the anode shell. The cathode piece is provided with a cathode tab which extends out of the electric core and is welded to the cathode shell. In the case that this existing coiled button cell is manufactured, the anode tab of the electric core is first bent to be closely attached to the lower surface of the electric core, and the anode tab extends to an area right below the axial cavity; the electric core is then vertically loaded into the anode shell; subsequently, a welding needle is vertically inserted downward into the axial cavity and the anode tab is pressed onto the anode shell; the anode tab and the anode shell are welded together in a manner of resistance welding; or the anode shell and the anode tab are welded together in a manner of laser welding, i.e., emitting laser to an area, facing vertically overlapped areas of the anode shell and the anode tab, from the lower side of the anode shell. The cathode tab of the electric core is welded to the cathode shell by using the same method. The cathode shell is sleeved with the insulating seal ring. The cathode shell covers an upper opening of the anode shell together with the insulating seal ring, and then sealed. Because the tabs are very thin, a current of resistance welding and a laser beam of laser welding will penetrate through the pole shell when the tabs are welded to the pole shell. The welding points for connecting the pole shell and the tabs are set to penetrate through the pole shell, which destroys the surface flatness and stability of the pole shell. In the process of using the cell, the welding points of the pole shell are prone to phenomena such as electrolyte leakage and surface bulging.

SUMMARY

The present disclosure provides a button cell, and a method for welding electrode tabs to a pole shell of the button cell. The welding method provided by the present disclosure can effectively prevent the flatness and stability of the surface of the pole shell from being destructed during the welding process, thereby avoiding the resulting phenomena such as electrolyte leakage and surface bulging.

The button cell provided by the present disclosure comprises a pole shell formed by buckling an anode shell and a cathode shell to each other, an electric core provided in the pole shell, and an insulating seal ring provided between overlapped portions of the anode shell and the cathode shell. The electric core is composed of an anode piece, a diaphragm and a cathode piece which are laminated and then coiled; the anode piece and the cathode piece are electrically connected to the anode shell and the cathode shell through an anode tab and a cathode tab. The button cell provided by the present disclosure further comprises at least one metal sheet, wherein the cathode tab and/or the anode tab of the electric core are welded to the metal sheet, and the metal sheet is then welded to the cathode shell and/or the anode shell. A method for welding the pole shell to an electrode tab of the button cell comprises the following steps:

S1, preparing a metal sheet, and welding one end, which extends out of the electric core, of the electrode tab to the metal sheet to form a first welding point between the electrode tab and the metal sheet; and S2, placing the metal sheet in the pole shell horizontally and pressing the metal sheet onto the inner surface of the pole shell, pressing two resistance-welded needle electrodes respectively onto the metal sheet or the outer surface of the pole shell and keeping the welding positions of the metal sheet and the electrode tab staggered, and then electrifying the needle electrodes, thereby realizing a fixed connection between the pole shell and the metal sheet, wherein at least a pair of second welding points are formed between the metal sheet and the pole shell.

According to the present disclosure, before the metal sheet is loaded into the pole shell, one end, which extends out of the electric core, of the electrode tab is welded onto the metal sheet. In addition, after the metal sheet is loaded into the pole shell, the metal sheet is welded to the pole shell from the inside of the pole shell in a manner of resistance welding. Meanwhile, two resistance-welded needle electrodes are defined to be subjected to a welding operation on the metal surface or the outer surface of the pole shell beside the welding positions of the metal sheet and the electrode tab. After the two needle electrodes are electrified, an annular welding current channel is formed between the two needle electrodes. The welding current will not penetrate through the pole shell, thereby keeping the appearance of the pole shell intact and eliminating the risk of cell leakage due to the rupture of the welding points. When multiple pairs of second welding points are formed between the metal sheet and the pole shell, the connection stability between the metal sheet and the pole shell is better. Meanwhile, there are many welding points between the metal sheet and the pole shell. Since an internal resistance of the welding position between the pole shell and the metal sheet is generally smaller than an internal resistance at a physical contact position between the pole shell and the metal sheet, the overall contact internal resistance between the pole shell and the metal sheet is smaller, and the smaller the contact internal resistance, the more favorable for cell discharge.

Preferably, the step S2 is performed continuously for 1 to 3 times, thereby forming 1 to 3 pairs of second welding points between the metal sheet and the pole shell and ensuring that the metal sheet and the pole shell are welded together reliably. Multiple pairs of welding points can ensure the welding quality between the metal sheet and the pole shell, and avoid insufficient welding.

Preferably, the contact positions between the two needle electrodes and the metal sheet in step S2 at different times are not overlapped, thereby avoiding the trouble of needle pullout when the needle electrodes and the metal sheet are adhered together since a molten pool expands in the case that the second welding points in the step S2 at different times are overlapped.

In the specific implementation process, in the step S2, the two resistance-welded needle electrodes may first be respectively pressed onto different positions on the surface of the metal surface beyond the welding positions of the metal sheet and the electrode tab, and the metal sheet is then pressed onto the inner surface of the pole shell.

In the specific implementation process, in the step S1, the metal sheet and the electrode tab are subjected to spot welding in a manner of laser welding or resistance welding.

In a specific implementation process, the step S1 and the step S2 are exchangeable. In addition, in the step S1, at least a pair of first welding points may be formed between the electrode tab and the metal sheet by resistance welding in parallel welding.

In one embodiment, the welding points of the pole shell and the electrode tab of the cell are all located inside the pole shell, such that the outer surface of the pole shell remains flat and intact. When there are multiple pairs of second welding points between the pole shell and the metal sheet, the pole shell is connected to the metal sheet more firmly, and the contact internal resistance is also smaller, which is beneficial to improve the discharge efficiency of the cell.

In another embodiment, in the step S2, after the metal sheet is pressed onto the inner surface of the pole shell, the pole shell is overturned to keep the outer surface upward, the two needle electrodes are then pressed onto the outer surface of the pole shell, and the metal sheet and the pole shell are welded together.

Preferably, each pair of second welding points are symmetrically distributed around the axis of the pole shell, and all second welding points are evenly distributed around the circumference with the center of the pole shell as a circle center. This design has higher welding efficiency and is more conducive to automated welding.

The button cell provided by the present disclosure comprises an anode shell, a cathode shell, an insulating seal ring and an electric core. The anode shell and the cathode shell are cup-shaped, respectively. The anode shell and the cathode shell are buckled with their upper opening and lower opening keeping face to face to form a cylindrical button cell shell. A gap is reserved between the anode shell and the cathode shell, and filled with the insulating seal ring to electrically isolate the anode shell from the cathode shell. An accommodating cavity is formed among the anode shell, the cathode shell and the insulating seal ring, and the electric core is provided in the accommodating cavity. The electric core is mainly composed of an anode piece, a diaphragm and a cathode piece which are laminated and then coiled, wherein the anode piece is electrically connected to an anode tab, and the anode tab is then electrically connected to the anode shell. The cathode piece is electrically connected to a cathode tab, and the cathode tab is then electrically connected to the cathode shell. A welding structure between the pole shell and the electrode tab of the cell provided by the present disclosure is adopted as at least one of the connection structure between the anode shell and the anode tab and the connection structure between the cathode shell and the cathode tab.

Preferably, the welding structure between the pole shell and the electrode tab of the cell provided by the present disclosure is adopted as the connection structure between the cathode shell and the cathode tab. In most existing manufacturing processes of button cells, the cell is assembled by taking the cathode shell as a bottom shell and the anode shell as a top shell, loading the electric core into the bottom shell and then covering correspondingly with the top shell. Therefore, the welding structure between the pole shell and the electrode tab of the button cell provided by the present disclosure may be adopted between the cathode shell and the cathode tab, such that the operability is higher.

In the third embodiment, a method for manufacturing a button cell comprises the following steps:
(1) preparing a metal sheet, and welding an anode tab of an electric core to the metal sheet together, such that a first welding point is formed between the anode tab and the metal sheet;
(2) preparing another metal sheet, and welding a cathode tab of the electric core to the metal sheet together, such that a first welding point is formed between the cathode tab and the metal sheet;
(3) attaching the metal sheet on the anode side and the metal sheet on the cathode side respectively onto two end surfaces of the electric core, and putting them into the anode shell of the button cell together with the electric core, pressing the two metal sheets respectively onto the inner surfaces of the anode shell and the cathode shell, and sealing the anode shell and the cathode shell; and
(4) pressing the two resistance-welded needle electrodes respectively onto outer surfaces of the anode shell and the cathode shell besides the welding positions of the metal sheets and the electrode tabs, and electrifying the two needle electrodes to realize welding fixation between the anode and cathode shells and the metal sheets.

Preferably, in the step 3, a side wall of the cathode shell is inserted into a side wall of the anode shell, such that the anode shell and the cathode shell are partially overlapped in a vertical direction, and the pole shell of the cell is then sealed by extruding the opening end wall of the anode shell inward.

As an alternative embodiment, in step (3), the metal sheet to which the anode tab has been welded may first be placed against the inner bottom of the anode shell, the metal sheet is then fixedly welded to the inside of the anode shell by using a double-needle electrode, and the electric core is subsequently placed inside the anode shell, such that the metal sheet on the cathode side is pressed onto the inner surface of the cathode shell; and the anode shell and the cathode shell are then sealed. The metal sheet and the cathode shell are then fixedly welded by welding from the outer surface of the cathode shell.

DETAILED DESCRIPTION

Figure 1:
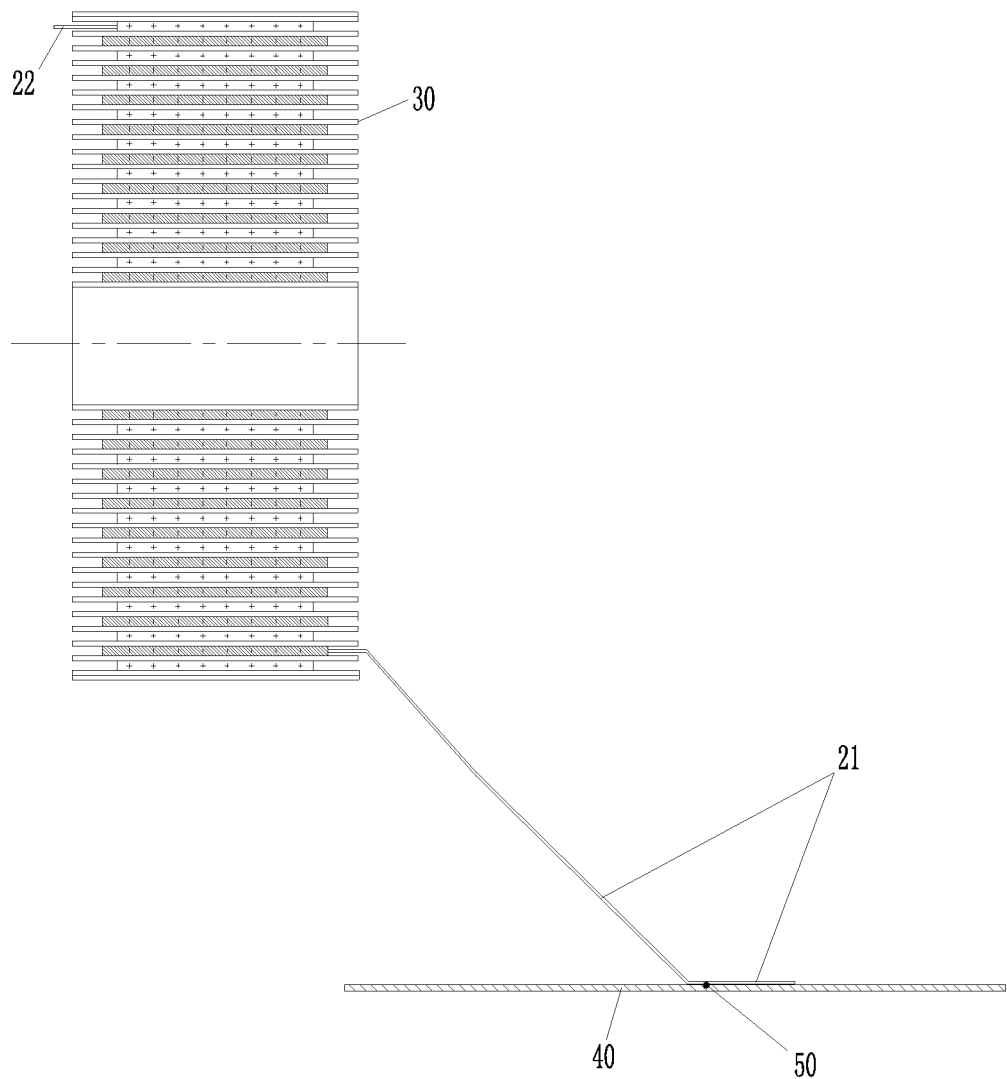
FIG. 1 is a schematic diagram of a welding structure between an electrode tab and a metal sheet in the present disclosure.

The present disclosure will now be described more fully hereinafter with reference to the accompanying drawings, in which exemplary embodiments of the present disclosure are shown. The present disclosure may, however, be embodied in many different forms and should not be construed as limited to the embodiments set forth herein. Rather, these embodiments are provided so that this disclosure is thorough and complete, and will fully convey the scope of the invention to those skilled in the art. Like reference numerals refer to like elements throughout.

The present disclosure will be further described in detail with reference to accompanying drawings and preferred embodiments.

Embodiment 1

FIGS. 1 to 4 show a first embodiment of the present disclosure. A button cell comprises a pole shell 10 and an electric core 30 installed inside the pole shell 10. The pole shell 10 consists of an anode shell 11 and a cathode shell 12. The anode shell and the cathode shell are cup-shaped respectively, and buckled to each other with their openings to form a complete pole shell. The electric core 30 is mainly composed of an anode piece 31, a diaphragm 33 and a cathode piece 32 which are laminated and then coiled. The anode piece 31 is electrically connected to an anode tab 21. The cathode piece 32 is electrically connected to a cathode tab 22. The button cell provided by the present disclosure further comprises at least one metal shell 40, wherein the cathode tab and/or the anode tab of the electric core is/are welded to the metal sheet, and the metal sheet is then welded to the cathode shell and/or the anode shell, thereby achieving an electric connection.

A welding method provided by the present disclosure comprises the following steps:

S1, preparing a metal sheet 40, and welding one end, which extends out of the electric core, of the electrode tab to the metal sheet to form a first welding point 50 between the electrode tab and the metal sheet; and S2, placing the metal sheet 40 in the pole shell 10 horizontally and pressing the metal sheet onto the inner surface of the pole shell, pressing two resistance-welded needle electrodes 100 and 200 respectively onto the surface of one side of the metal sheet 40 facing the electric core, and then electrifying the needle electrodes, thereby realizing a fixed connection between the pole shell and the metal sheet. The welding position between the metal sheet to the pole shell should be staggered from the welding position between the metal sheet and the electrode tab. The welding step of the metal sheet and the pole shell is performed once or more. At least a pair of second welding points 60 are formed between the metal sheet and the pole shell, and are symmetrically distributed with respect to the axis of the pole shell.

Figure 3:
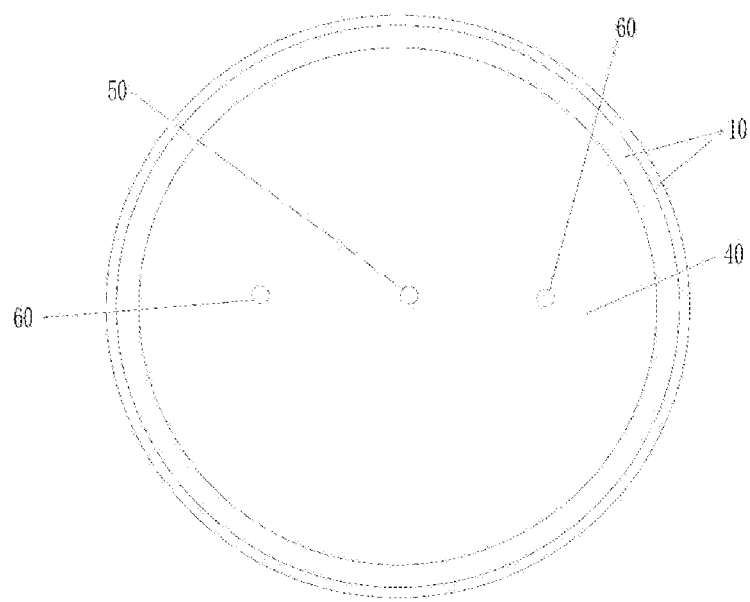
FIG. 3 is a plan view of a welding position in Embodiment 1.

FIG. 3 shows a schematic diagram of the welding points in the step S2. A dotted circle in FIG. 3 indicates the positions of the second welding points 60. The step 2 in FIG. 3 is operated only once, with a pair of second welding points being formed.

Figure 2:
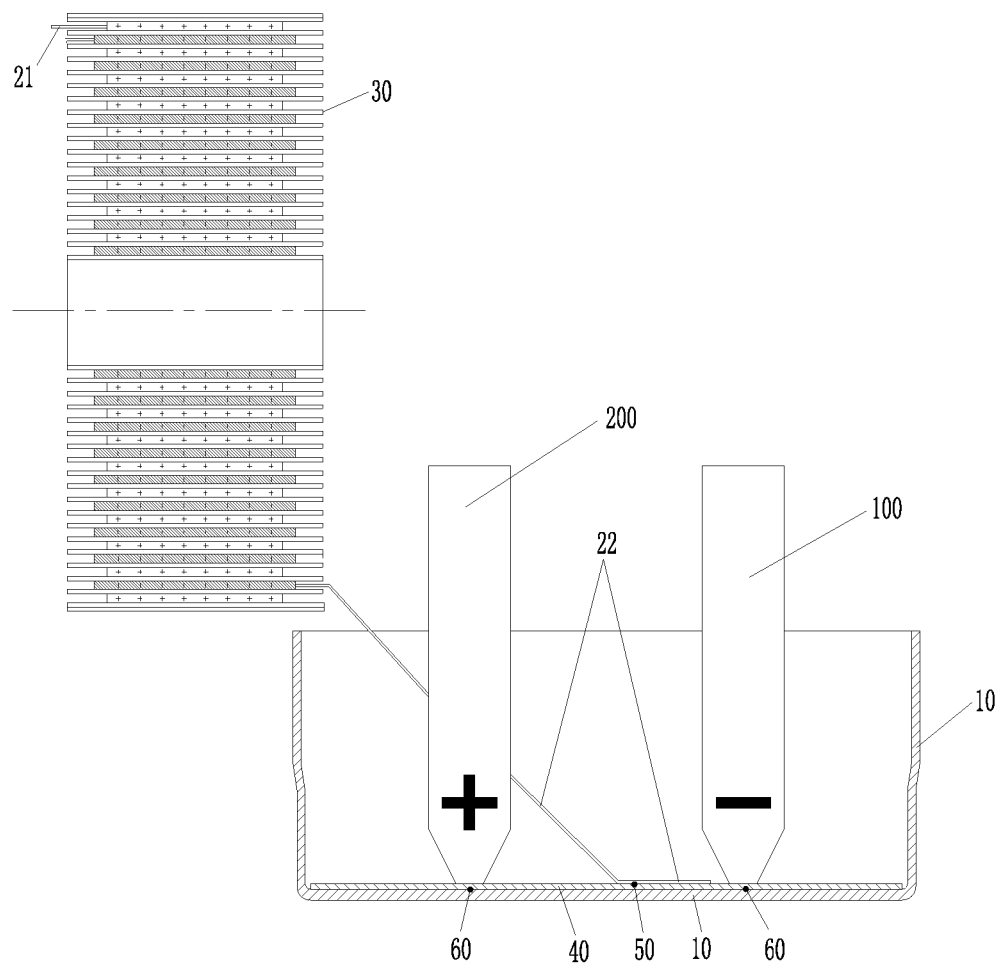
FIG. 2 is a schematic diagram in which a metal sheet and a pole shell are welded from the inner side in the present disclosure.

As shown in FIG. 2, in this embodiment, a molten pool and welding points are formed on the inner side of the pole shell 10, thereby maintaining the appearance of the pole shell intact, and eliminating the risk of cell leakage due to the rupture of the welding points. In addition, at least a pair of second welding points 60 are formed between the metal sheet 40 and the pole shell 10, and the metal sheet and the pole shell are connected more stably. A large number of welding points between the metal sheet and the pole shell can reduce a contact internal resistance between the metal sheet and the pole shell, and increase the discharge efficiency of the cell. Moreover, the electrode tab and the metal sheet are connected by spot welding to avoid the damage to the electrode tab. Moreover, this embodiment facilitates the detection of the welding quality between the electrode tab and the metal sheet and between the metal sheet and the pole shell, thereby avoiding insufficient welding.

Figure 4:
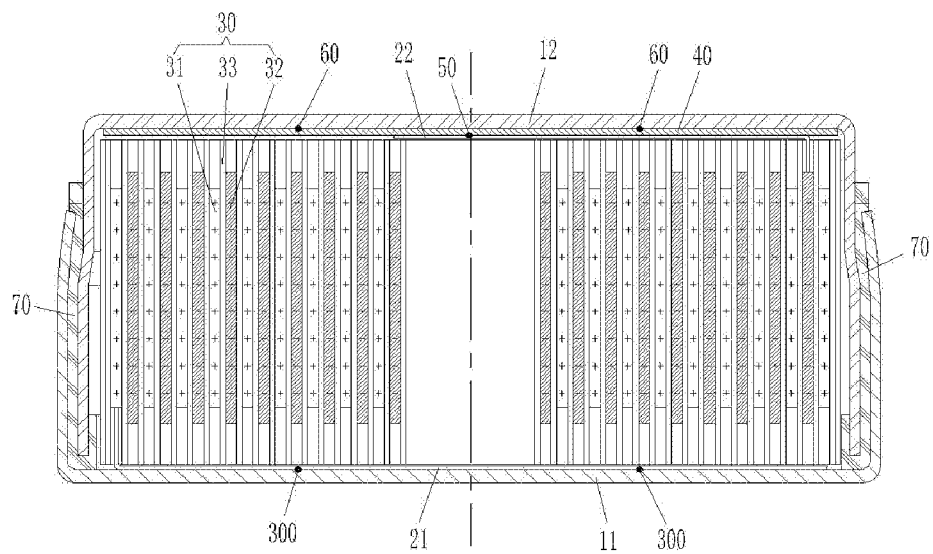
FIG. 4 is a schematic sectional view of a button cell in Embodiment 1.

As shown in FIG. 4, in this embodiment, the cathode tab 22 extending out of the electric core 30 is fixedly connected to the metal sheet 40 through a first welding point 50. The inner surface of the cathode shell 12 corresponding to the cathode tab is horizontally and fixedly connected to the metal sheet 40 through second welding points 60. A pair of second welding points 60 may be formed. The position of the first welding point is staggered from and not overlapped with the positions of the second welding points 60.

In Embodiment 1, a metal wheel is provided inside the cathode shell 12. An electrode tab correspondingly electrically connected to this cathode shell 12 is a cathode tab 22 electrically connected to a cathode piece 32. A metal wheel may also be provided inside the anode shell. In this case, an electrode tab correspondingly electrically connected to this anode shell is an anode tab 21 electrically connected to an anode piece 31. A metal sheet may also be provided on the anode shell and the cathode shell respectively. The anode tab and the cathode tab are fixedly welded to the anode shell and the cathode shell through the metal sheets.

The button cell shown in FIG. 4 comprises an anode shell 11, a cathode shell 12, an insulating seal ring 70 and an electric core 30. The anode shell 11 and the cathode shell 12 are cup-shaped, respectively. The anode shell 11 and the cathode shell 12 are buckled with their upper opening and lower opening keeping face to face to form a cylindrical button cell shell 10. A gap is reserved between the anode shell 11 and the cathode shell 12, and filled with the insulating seal ring 70 to electrically isolate the anode shell 11 from the cathode shell 12. An accommodating cavity is formed among the anode shell 11, the cathode shell 12 and the insulating seal ring 70, and the electric core 30 is provided in the accommodating cavity. The electric core 30 is mainly composed of an anode piece 31, a diaphragm 33 and a cathode piece 32 which are laminated and then coiled. The anode piece 31 is electrically connected to an anode tab 21, and the anode tab is then electrically connected to the anode shell 11. The cathode piece 32 is electrically connected to a cathode tab 21, and the cathode tab 22 is then electrically connected to the cathode shell 12 through the metal sheet 40. The cathode shell 12 and the cathode tab 22 are connected by welding with the welding method provided by the present disclosure. The anode shell 11 and the anode tab 21 are connected by adopting a welding structure formed by directly welding the anode tab 21 onto the inner surface of the anode shell 11 by resistance welding in parallel welding at the inner side of the anode shell 11. That is, the inner surface of the anode shell 11 is fixedly connected to the anode tab 21 through third welding points 300, wherein there may be a pair of or multiple pairs of third welding points 300.

Embodiment 2

Figure 5:
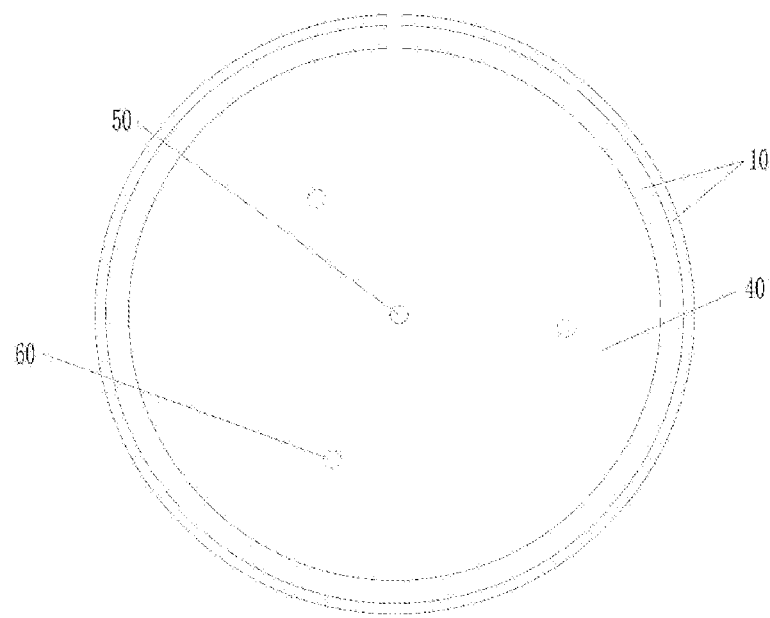
FIG. 5 is a plan view of a welding position in Embodiment 2.

As shown in FIG. 5, the welding structure between the pole shell and the electrode tab of the cell in Embodiment 2 is different from that in Embodiment 1: the step S2 is operated continuously for two times to form two pairs of second welding points 60 between the metal sheet 40 and the pole shell 10; and in the step S2 in different times, there are overlaps between two welding points among the welding positions between the metal sheet and the pole shell. The remaining steps are the same as those in Embodiment 1. The positions of the second welding points 60 are indicated by a dotted circle in FIG. 5.

Embodiment 3

Figure 6:
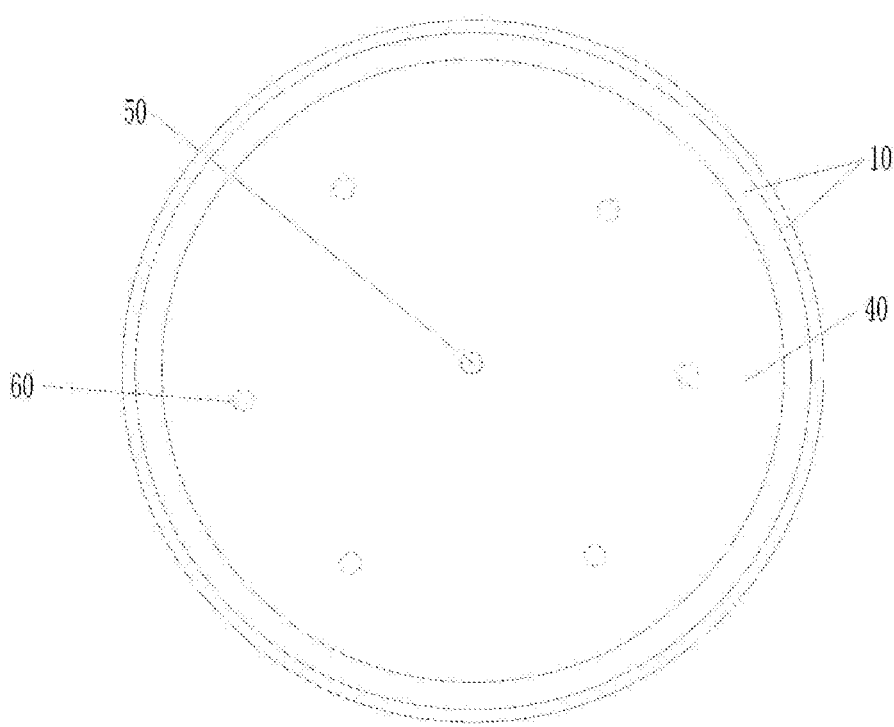
FIG. 6 is a plan view of a welding position in Embodiment 3.

As shown in FIG. 6, in Embodiment 3, the step S2 is operated continuously for three times to form three pairs of second welding points 60 between the metal sheet 40 and the pole shell 10; and in the step S2 in different times, the welding positions between the metal sheet and the pole shell are not overlapped. The remaining steps are the same as those in Embodiment 1. The positions of the second welding points 60 are indicated by a dotted circle in FIG. 6.

According to the welding method and welding structure in Embodiment 2 and Embodiment 3, a molten pool and welding points are only formed inside the pole shell 10, thereby maintaining the appearance of the pole shell 10 intact, and eliminating the risk of cell leakage due to the rupture of the welding points. In addition, multiple pairs of second welding points 60 are formed between the metal sheet and the pole shell, such that the metal sheet and the pole shell are connected more stably. Meanwhile, the contact internal resistance between the metal sheet and the pole shell is small, which is beneficial to improve the discharge efficiency of the cell.

Embodiment 4

Figure 7:
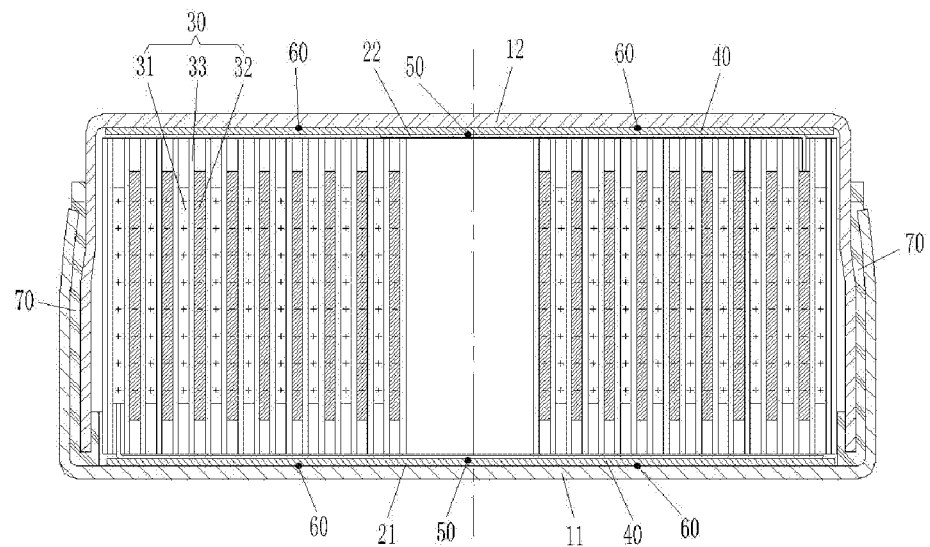
FIG. 7 is a section view of a button cell in which metal sheets are respectively provided on the inner sides of the anode shell and the cathode shell.

As shown in FIG. 7, the button cell in Embodiment 4 differs from the button cell in Embodiment 1 in that: the anode shell 11 and the anode tab 21 are also connected through the metal sheet 40 by welding with the welding method for the pole shell and the cathode tab of the cell in Embodiment 1.

Generally, the electrode tab is a metal foil that can be bent arbitrarily. In the specific implementation process, in the step S2, two needle electrodes, a cathode 100 and an anode 200 may first be pressed onto the metal sheet 40 respectively, wherein the pressing positions on the needle electrodes are different from the welding positions of the electrode tab and the metal sheet; and the metal sheet 40 is then pressed onto the inner surface of the pole shell 10, and then fixedly welded by laser welding or resistance welding.

As shown in FIG. 3, FIG. 5 and FIG. 6, all the second welding points 60 are evenly and symmetrically distributed around the axis of the pole shell 10. This arrangement facilitates automated welding operations and improves the welding efficiency. Of course, the second welding points 60 may be provided at any position on the contact surfaces between the metal sheet 40 and the pole shell 10, and it is preferable to make all the second welding points 60 evenly distributed around the circumference with the center of the pole shell 10 as a circle center. In this way, the metal sheet 40 and the pole shell 10 are connected more reliably. In addition, salient points will be formed on the outer surface of the pole shell 10 in response to each of the second welding points 60. If these salient points are evenly distributed, the outer surface of the pole shell 10 is also more attractive.

In most existing manufacturing processes of button cells, the cell is assembled by taking the cathode shell 12 as a bottom shell and the anode shell 11 as a top shell, loading the electric core 30 into the bottom shell and then covering correspondingly with the top shell. Therefore, the above-mentioned welding method for the pole shell and the electrode tab of the cell may be preferably used between the cathode shell 12 and the cathode tab 22, such that the operability is higher.

As an alternative, the steps S1 and S2 in the welding method for the pole shell and the electrode tab of the cell provided by the present disclosure are exchangeable, i.e., the metal sheet is welded to the pole shell first, and the electrode tab is then welded to the metal sheet.

Figure 8:
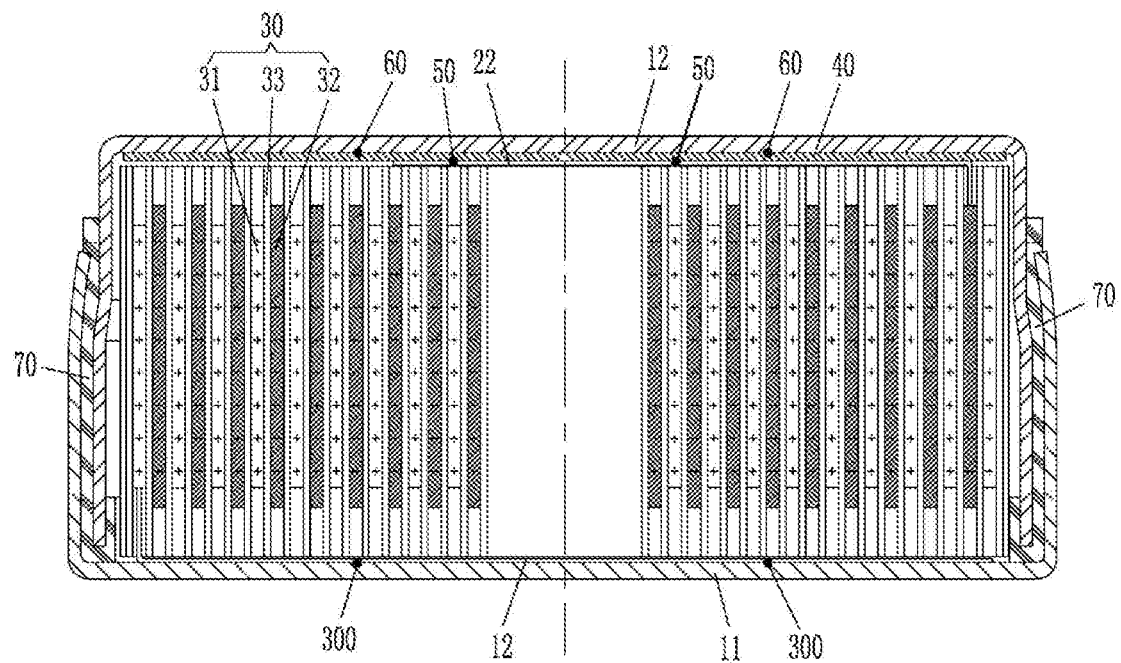
FIG. 8 is a section view of a button cell in which a metal sheet is provided on one side of each of the anode shell and the cathode shell.

As an alternative, in the step S1, at least a pair of first welding points 50 may be formed between the electrode tab and the metal sheet by resistance welding in parallel welding, as shown in FIG. 8.

Figure 9:
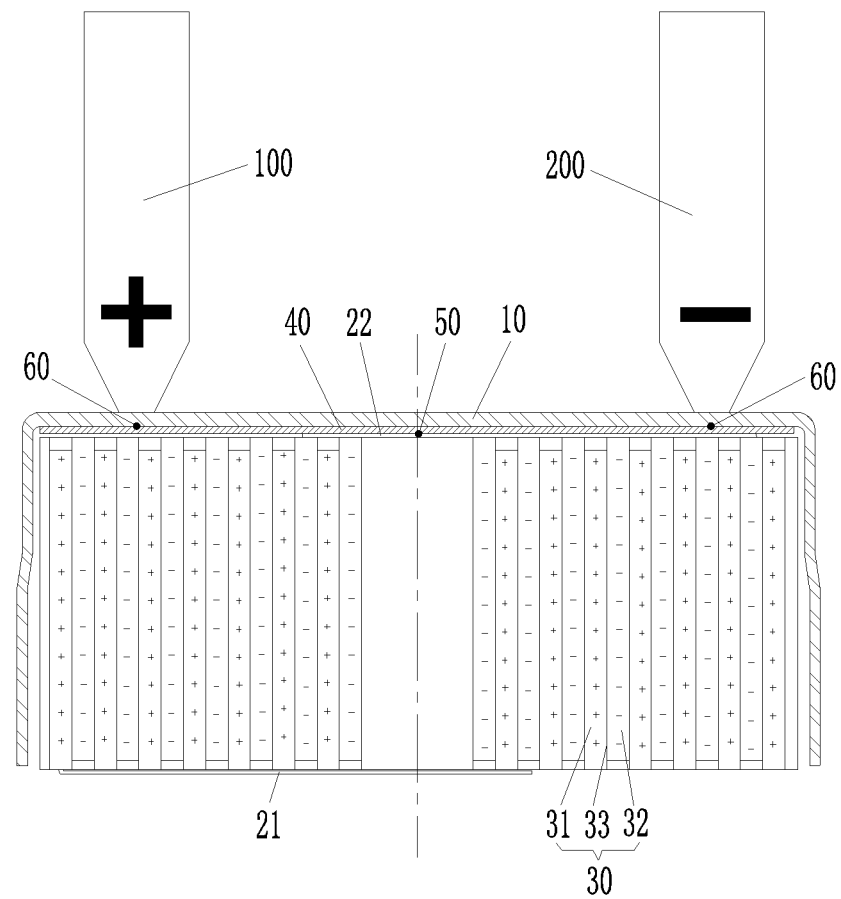
FIG. 9 is a schematic diagram in which a metal sheet is welded from the outside of a pole shell.

As shown in FIG. 9, as another implementation manner, after the metal sheet 40 is pressed onto the inner surface of the pole shell 10 in the step S2, the pole shell 10 equipped with the metal sheet 40 is overturned to a position where the outer surface of the pole shell faces upward; the two needle electrodes 100 and 200 are then pressed onto the outer surface of the pole shell respectively and then welded, so that the welding operation is more convenient.

Figure 10:
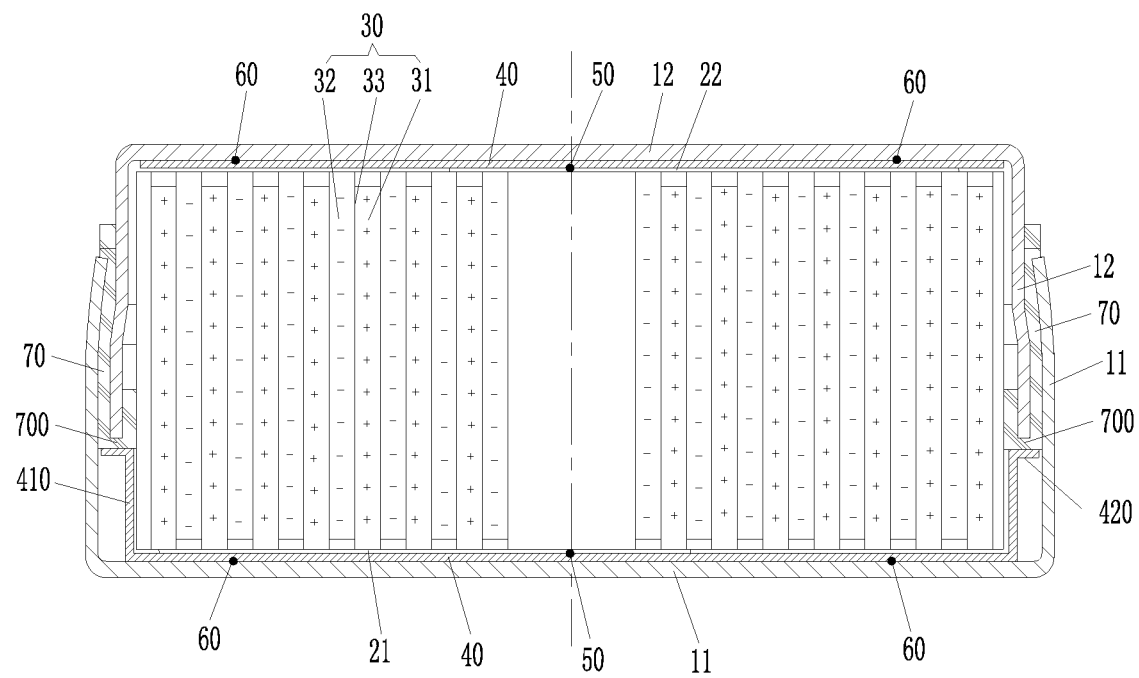
FIG. 10 is a schematic diagram of a metal sheet with an annular flange.
Figure 11:
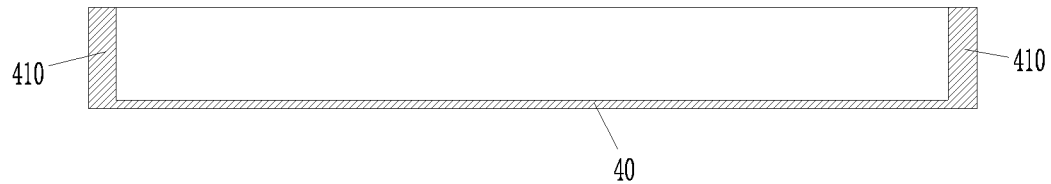
FIG. 11 is a schematic structural diagram of a metal sheet in one embodiment.

As shown in FIG. 10, the button cell produced using the welding method provided by the present disclosure comprises a pole shell composed of an anode shell 11 and a cathode 12. The anode shell and the cathode shell are partially overlapped in a vertical direction. A side wall of the opening end of the cathode shell 12 is located inside the opening end of the anode shell 11. A gap is reserved between the side wall of the opening end of the cathode shell 12 and the side wall of the opening end of the anode shell 11. An insulating seal ring 70 is sandwiched inside the gap, and the lower end of the insulating seal ring 70 extends inward to form a bent portion 700. The bent portion wraps the side wall of the opening end of the cathode shell inside. An annular cavity for accommodating the electric core is formed among the anode shell 11, the electric core 30 and the insulating seal ring 70. The edge of the metal sheet 40 on the anode side may be bent vertically to one side of the electric core to form an annular flange 410. The annular flange 410 may function to fix the electric core, as shown in FIG. 11. When a cell sealing operation is performed by extruding the upper edge of the anode shell 11 inward, a downward pressing force will be transferred to the annular flange 410 during the inward bending process of the upper edge of the anode shell 11, such that the physical contact between the metal sheet 40 and the anode shell 11 is closer. The outer edge of the metal sheet 40 on the cathode side may also extend vertically downward to form an annular flange.

Preferably, the top of the annular flange 410 may also be bent vertically outward to form an annular edge 420. The annular edge abuts against the bottom of the bent portion 700 of the insulating seal ring, as shown in FIG. 10. This structure makes the contact area between the metal sheet 40 and the anode shell 11 larger, thereby achieving a better current collecting effect.

It should be noted that when welding with the method provided by the present disclosure is performed for only one of the connection structure between the anode shell 11 and the anode tab 21 and the connection structure between the cathode shell 12 and the cathode tab 22, in the other connection structure, the electrode tab may also be directly adhered to the corresponding pole shell through conductive glue; or the electrode tab is physically connected to the corresponding pole shells by physical contact, etc., by means of any of the existing connection methods that can realize the electrical connection between the electrode tabs and the corresponding pole shells. In addition, the first welding point in the present disclosure is not limited to one welding point in the accompanying drawings, and may be two or more welding points. The structure of the cell 30 in the present disclosure is not limited to the specific structures shown in the accompanying drawings, but may be any cell structure.

The foregoing description of the exemplary embodiments of the present disclosure has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A button cell, comprising:
   a pole shell formed by buckling an anode shell and a cathode shell to each other;
   an electric core provided in the pole shell, and
   an insulating seal ring provided between overlapped portions of the anode shell and the cathode shell, wherein
   the electric core is composed of an anode piece, a diaphragm and a cathode piece which are laminated and then coiled;
   the anode piece and the cathode piece are electrically connected to the anode shell and the cathode shell through an anode tab and a cathode tab;
   the button cell further comprises at least one metal shell;
   the cathode tab and/or the anode tab of the electric core is/are welded to a metal sheet; and
   the metal sheet is then welded to the cathode shell and/or the anode shell.

2. The button cell according to claim 1, wherein the cathode tab of the electric core is welded to the metal sheet to form a first welding point, and the metal sheet is welded to the cathode shell to form at least a pair of second welding points.

3. The button cell according to claim 1, comprising at least two metal sheets, wherein the anode tab and the cathode tab of the electric core are welded to respective metal sheets respectively to form first welding points, and the two metal sheets are welded to the anode shell and the cathode shell respectively to form at least a pair of second welding points.

4. The button cell according to claim 1, wherein the metal sheet on the anode shell side covers the electric core, and the edge of the metal sheet is vertically bent toward one side of the electric core to form an annular flange.

5. The button cell according to claim 4, wherein the top of the annular flange is vertically bent outward to form an annular edge, and the annular edge abuts against the bottom of the insulating seal ring between the anode shell and the cathode shell.

6. A method for welding the pole shell to the electrode tabs of the button cell according to claim 1, comprising the following steps:
   S1, preparing a metal sheet, and welding one end, which extends out of the electric core, of an electrode tab to the metal sheet to form a first welding point between the electrode tab and the metal sheet; and
   S2, placing the metal sheet horizontally in the pole shell and pressing the metal sheet onto the inner surface of the pole shell, pressing two needle electrodes respectively onto the metal sheet or the outer surface of the pole shell and keeping the welding positions of the metal sheet and the electrode tab staggered, and then electrifying the needle electrodes, thereby realizing a fixed connection between the pole shell and the metal sheet, wherein
   the step S1 and the step S2 are exchangeable.

7. The welding method according to claim 6, wherein the step S2 is operated for 1 to 3 times to form multiple pairs of second welding points between the metal sheet and the pole shell.

8. The welding method according to claim 7, wherein the second welding points are evenly distributed around the axis of the pole shell.

9. The welding method according to claim 6, wherein the cathode tab of the electric core is welded to the metal sheet; the two resistance-welded needle electrodes are pressed onto the metal sheet respectively, and the metal sheet is pressed onto the inner surface of the cathode shell and welded.

10. The welding method according to claim 6, wherein in the step S1, the metal sheet and the electrode tab are subjected to spot welding in a manner of laser welding or resistance welding.

11. The welding method according to claim 6, wherein in the step S1, the electrode tab and the metal sheet are welded in a manner of parallel resistance welding to form a pair of first welding points.

12. The welding method according to claim 6, wherein in the step S2, after the metal sheet is pressed onto the inner surface of the pole shell, the pole shell is overturned to keep the outer surface upward, the two needle electrodes are then pressed onto the outer surface of the pole shell, and the metal sheet and the pole shell are welded together.

13. A method for welding the pole shell to the electrode tabs of the button cell according to claim 2, comprising the following steps:

S1, preparing a metal sheet, and welding one end, which extends out of the electric core, of an electrode tab to the metal sheet to form a first welding point between the electrode tab and the metal sheet; and S2, placing the metal sheet horizontally in the pole shell and pressing the metal sheet onto the inner surface of the pole shell, pressing two needle electrodes respectively onto the metal sheet or the outer surface of the pole shell and keeping the welding positions of the metal sheet and the electrode tab staggered, and then electrifying the needle electrodes, thereby realizing a fixed connection between the pole shell and the metal sheet, wherein the step S1 and the step S2 are exchangeable.

14. A method for welding the pole shell to the electrode tabs of the button cell according to claim 3, comprising the following steps:

S1, preparing a metal sheet, and welding one end, which extends out of the electric core, of an electrode tab to the metal sheet to form a first welding point between the electrode tab and the metal sheet; and S2, placing the metal sheet horizontally in the pole shell and pressing the metal sheet onto the inner surface of the pole shell, pressing two needle electrodes respectively onto the metal sheet or the outer surface of the pole shell and keeping the welding positions of the metal sheet and the electrode tab staggered, and then electrifying the needle electrodes, thereby realizing a fixed connection between the pole shell and the metal sheet, wherein the step S1 and the step S2 are exchangeable.

15. A method for welding the pole shell to the electrode tabs of the button cell according to claim 4, comprising the following steps:

S1, preparing a metal sheet, and welding one end, which extends out of the electric core, of an electrode tab to the metal sheet to form a first welding point between the electrode tab and the metal sheet; and S2, placing the metal sheet horizontally in the pole shell and pressing the metal sheet onto the inner surface of the pole shell, pressing two needle electrodes respectively onto the metal sheet or the outer surface of the pole shell and keeping the welding positions of the metal sheet and the electrode tab staggered, and then electrifying the needle electrodes, thereby realizing a fixed connection between the pole shell and the metal sheet, wherein the step S1 and the step S2 are exchangeable.

16. A method for welding the pole shell to the electrode tabs of the button cell according to claim 5, comprising the following steps:

S1, preparing a metal sheet, and welding one end, which extends out of the electric core, of an electrode tab to the metal sheet to form a first welding point between the electrode tab and the metal sheet; and S2, placing the metal sheet horizontally in the pole shell and pressing the metal sheet onto the inner surface of the pole shell, pressing two needle electrodes respectively onto the metal sheet or the outer surface of the pole shell and keeping the welding positions of the metal sheet and the electrode tab staggered, and then electrifying the needle electrodes, thereby realizing a fixed connection between the pole shell and the metal sheet, wherein the step S1 and the step S2 are exchangeable.

* * * * *